United States Patent [19]

Kami et al.

[11] Patent Number: 5,560,651
[45] Date of Patent: Oct. 1, 1996

[54] SUBFRAME AND SUBFRAME ASSEMBLY

[75] Inventors: Yozo Kami; Tokio Isono; Yasunori Oku; Kiyoshi Nakajima; Kosei Mizumoto, all of Wako, Japan

[73] Assignee: Honda Giken Kogyo Kabushiki Kaisha, Tokyo, Japan

[21] Appl. No.: 215,946

[22] Filed: Mar. 22, 1994

[30] Foreign Application Priority Data

| Mar. 26, 1993 | [JP] | Japan | 5-068168 |
| Apr. 2, 1993 | [JP] | Japan | 5-077099 |
| Dec. 27, 1993 | [JP] | Japan | 5-331599 |

[51] Int. Cl.$^6$ ............ B62D 21/11; B60K 13/04; B60G 21/00
[52] U.S. Cl. ............ 280/788; 280/673; 280/834; 280/689; 180/296; 180/309; 180/311
[58] Field of Search ............ 180/69.4, 296, 180/311, 312, 309; 280/834, 831, 781, 784, 660, 673, 675, 833, 788, 689; 296/204

[56] References Cited

U.S. PATENT DOCUMENTS

| 3,243,007 | 3/1966 | Berckhan | 280/788 |
| 3,551,990 | 1/1971 | Wehner | 280/673 |
| 4,284,162 | 8/1981 | Ishida | 180/296 |
| 4,453,740 | 6/1984 | von der Ohe et al. | 180/312 |
| 4,787,643 | 11/1988 | Shirata | 280/834 |
| 4,930,804 | 6/1990 | Tattermusch et al. | 280/675 |
| 4,943,092 | 7/1990 | Haraguchi et al. | 280/788 |
| 5,195,780 | 3/1993 | Inoue et al. | 280/834 |
| 5,201,547 | 4/1993 | Ogawa et al. | 280/834 |

FOREIGN PATENT DOCUMENTS

| 0301219 | 2/1989 | European Pat. Off. |  |
| 0743439 | 12/1943 | Germany | 180/309 |
| 893016 | 7/1949 | Germany. |  |
| 2569 | 7/1952 | Germany. |  |
| 0225420 | 10/1987 | Japan | 280/834 |
| 0025082 | 2/1991 | Japan | 280/781 |
| 4011517 | 1/1992 | Japan | 280/834 |
| 4095585 | 3/1992 | Japan | 180/311 |
| 5-8643 | 1/1993 | Japan. |  |
| 662538 | 12/1951 | United Kingdom. |  |
| 1114632 | 5/1968 | United Kingdom. |  |
| 1274330 | 5/1972 | United Kingdom. |  |
| 2089744 | 6/1982 | United Kingdom. |  |
| 2225986 | 6/1990 | United Kingdom. |  |
| 2265867 | 10/1993 | United Kingdom. |  |
| 0016386 | 10/1992 | WIPO | 280/675 |

OTHER PUBLICATIONS

Patent Abstracts of Japan, M–1102, Apr. 12, 1991, vol. 15, No. 146, Application No. 64–161946, Feb. 1, 1991, "Ladder Type Sub Frame Structure for Vehicle".

Primary Examiner—Paul N. Dickson
Attorney, Agent, or Firm—Armstrong, Westerman, Hattori, McLeland & Naughton

[57] ABSTRACT

A subframe assembly for assembly as a unit to a vehicle body in which a subframe is formed of left and right side members disposed on the left and right of a fuel tank, and a cross member interconnecting the side members; left and right suspensions are mounted to the subframe and a vehicle member is disposed at a lower portion of the vehicle body and supported on the subframe. The subframe and vehicle member are assembled and the assembled subframe and vehicle member are then assembled to the vehicle body.

16 Claims, 16 Drawing Sheets

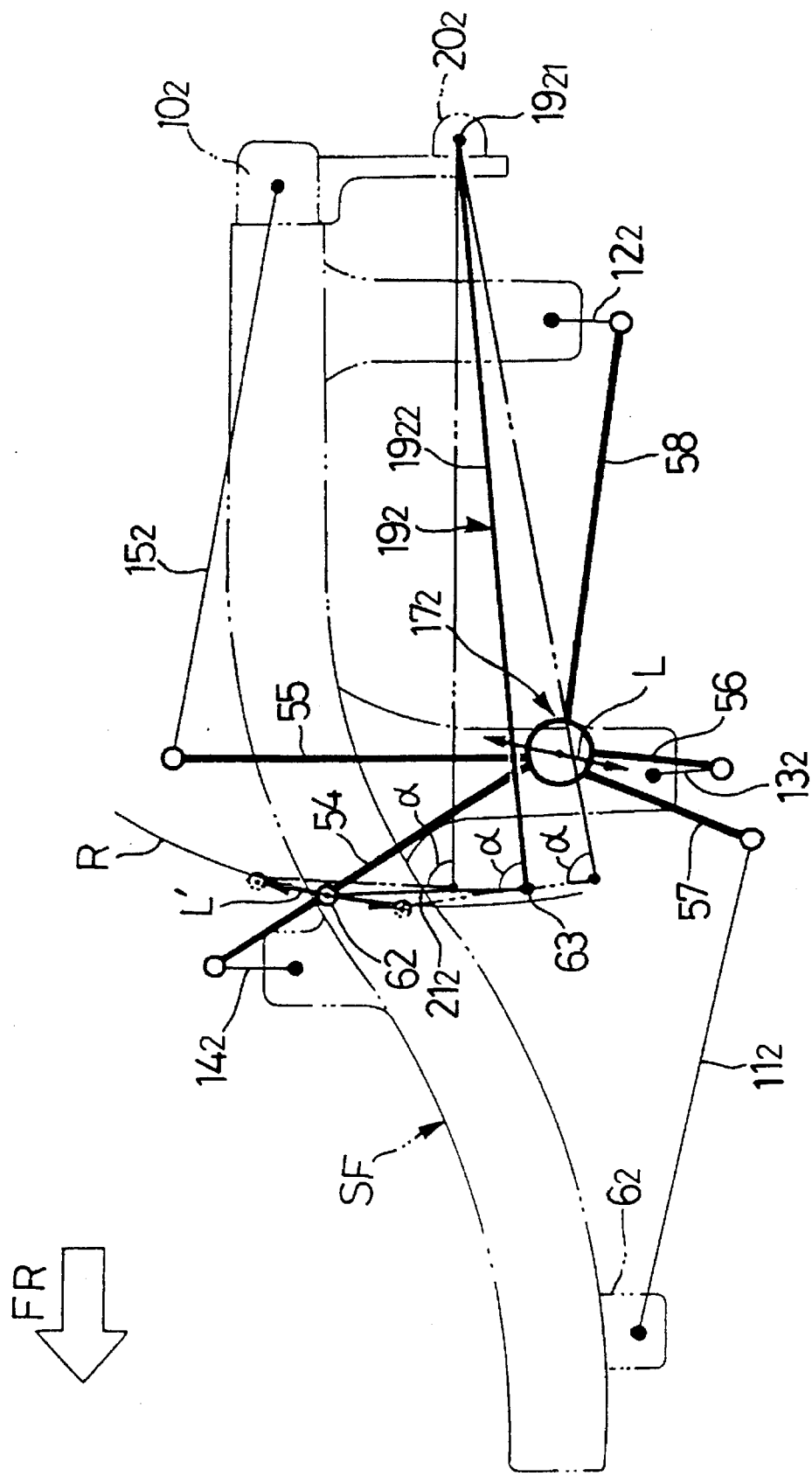

SUBFRAME AND SUBFRAME ASSEMBLY

BACKGROUND OF THE INVENTION

1. Field of the Invention

The present invention relates to a subframe including left and right side members disposed on the left and right sides of a fuel tank in a vehicle, and a cross member interconnecting the side members; and relates to a subframe assembly formed by assembling left and right suspensions to such subframe.

2. Description of the Prior Art

There is a conventionally known subframe described in Japanese Patent Application Laid-Open No. 11517/92.

The above prior art subframe is not constructed as such a unit, that is formed by integrally assembling thereto a vehicle member, such as an exhaust system, which is to be disposed at a lower portion of a vehicle body. Therefore, it is necessary to separately assemble the vehicle member, after assembling the subframe to a main frame of the vehicle body, and it is difficult to reduce the number of assembling steps. Further, when the subframe is constructed as a unit, it is also necessary to enhance the strength of the subframe.

SUMMARY OF THE INVENTION

Accordingly, it is an object of the present invention to provide a subframe and a subframe assembly, wherein the vehicle member, and the subframe can easily be mounted to the vehicle body and constructed as a unit, thereby reducing the number of assembling steps.

To achieve the above object, according to a first aspect and feature of the present invention, there is provided a subframe assembly for assembly as a unit to a vehicle body, including a subframe comprised of left and right side members disposed on the left and right of a fuel tank in a vehicle, and a cross member interconnecting the side members, left and right suspensions to be assembled to the subframe; and a vehicle member, which is disposed at a lower portion of a vehicle body and is supported on the subframe.

With the above construction, the sub frame assembly can previously be assembled, as a unit, and collectively mounted to a main frame of the vehicle body, thereby reducing the number of assembling steps and contributing to an improvement in productivity.

In addition to the first aspect, if the fuel tank is disposed in a space surrounded by the side members and the cross member and supported on the subframe, the fuel tank is protected by the subframe upon collision of the vehicle.

Further, the cross member may connect front ends of the left and right side members, and the subframe may include left and right mounts fixed to the main frame of the vehicle body in the vicinity of junctions between the side members and the cross member. A stabilizer may be disposed along a front surface of the cross member and may be connected at its opposite ends to the suspensions to while by passing the left and right mounts. Thus, it is possible to insure the length of a torsion portion of the stabilizer, to the maximum, to effectively oppose a torsional load. Moreover, it is possible to avoid an interference between a component mounted inside the subframe and the stabilizer, while the stabilizer is reasonably disposed in the minimal space.

Yet further, left and right suspension brackets may be mounted at corners of the subframe which are junctions between the left and right side members and the cross member. Each of the suspension brackets may be suspended between the respective side member and the one cross member to connect them, and the stabilizer may be resiliently supported on the cross member in the vicinity of the suspension brackets. Thus, it is possible to firmly support the stabilizer at a portion of the subframe having a high rigidity.

Yet further, the stabilizer may be comprised of a torsion portion extending widthwise of the vehicle body and supported by a stabilizer supporting member, and arm portions integrally connected to opposite ends of the torsion portion and extending forwardly of the vehicle body, and each of the suspensions may comprise a knuckle supporting a wheel, a trailing arm extending rearwardly of the vehicle body, from a support point on the subframe, and connected to the knuckle below an axle, a leading arm, extending forwardly of the vehicle body from a support point on the subframe and connected to the knuckle above the axle, a lateral arm, extending widthwise of the vehicle body from a support point on the subframe and connected to the knuckle, a stabilizer supporting member for supporting the torsion portion of the stabilizer extending widthwise of the vehicle body, onto the sub frame more rearwardly of the vehicle body than the knuckle, and a vertically extending stabilizer link, connected at its upper end to an upper portion of the knuckle and at its lower end to a tip end of the arm portion of the stabilizer. With such construction, even if a vertical external force is applied to the wheel to cause the knuckle to be moved on a locus connecting a front lower portion and a rear upper portion of the vehicle body, the distance between a connecting portion, for connecting an upper end of the stabilizer link to the knuckle, and the stabilizer, cannot be largely varied, because the stabilizer supporting member is mounted more rearwardly than the knuckle. Thus, even if the knuckle is moved, the angle formed by the stabilizer link and the arm portion of the stabilizer cannot be largely varied, thereby enabling the stabilizer to function effectively.

Yet further, if a locus for movement of a connection between the knuckle and the upper end of the stabilizer link is substantially matched with a circular arc about the stabilizer supporting member, it is possible to prevent a variation in angle formed between the stabilizer link and the arm portion of the stabilizer, thereby enabling the stabilizer to function further effectively.

Yet further, if the axis of a mounting portion at an outer end of the lateral arm mounted on the knuckle and the axis of a mounting portion at an upper end of the stabilizer link are set substantially parallel to each other, it is possible to simultaneously machine the mounting portions to reduce the machining cost.

In addition to the above first aspect, an exhaust system may be supported on the sub frame in front and in rear of the suspensions, and an exhaust pipe may be mounted to extend along the laterally outer side of the side member. Thus, it is possible to accurately maintain the relative position of the exhaust system relative to the suspensions to prevent an interference between both of them.

Further, the suspension may be comprised of an upper suspension arm portion and a lower suspension arm portion, and the exhaust pipe may be disposed between the upper and lower suspension arm portions. Thus, there is no need for the suspension parts to be curved in order to avoid an interference with the exhaust pipe. This prevents a reduction in rigidity of the suspension arms.

Yet further, the exhaust pipe may be supported on laterally by one side of the subframe, and a filler pipe of the fuel tank may be supported on the laterally other side of the subframe.

Thus, it is possible to satisfactorily maintain a lateral weight balance of the subframe assembly to facilitate the assembling of the subframe assembly to the vehicle body and, moreover, to equalize the load on the mounting portions of the vehicle body.

Yet further, the exhaust pipe and the filler pipe may be supported at a rear portion of the subframe, and the expansion chamber may be supported at a front portion of the subframe. Thus, it is possible to satisfactorily maintain a longitudinal weight balance of the sub frame assembly to facilitate the assembling of the subframe assembly to the vehicle body and, moreover, to further equalize the load on the mounting portions to the vehicle body.

Yet further, the expansion chamber of the exhaust system may be disposed in a lateral direction below a seat portion of a seat mounted forwardly of the subframe and may be supported on the subframe. Thus, it is possible to sufficiently insure the volume of the expansion chamber by utilizing a space below the seat portion of the seat.

Yet, further, the subframe may be mounted to a lower portion of the main frame, and a breather pipe may pass between the subframe and the main frame and extend upwardly. A recess may be defined on a lower surface of the main frame opposed to the breather pipe. Thus, it is possible not only to extend the breather pipe upwardly without an interference with the main frame, but also to raise the position of the breather pipe to bring its connection to the fuel tank to as a high level, as possible thereby increasing the substantial capacity of the tank by effectively utilizing the internal volume of the fuel tank.

Yet, further, the filler pipe and the breather pipe may be supported on the subframe through resilient members, respectively. Thus, it is possible to support the filler pipe and the breather pipe in a stable state on the subframe, and it is possible to easily conduct an operation for collectively mounting the fuel tank along with the subframe on the main frame. Moreover, it is possible to effectively suppress the transfer of a vibration from the subframe to the filler pipe and the breather pipe by the resilient members.

Still further, flexible portions may be provided in the filler pipe and the breather pipe between their fixed portions to the vehicle body and the resilient members. Thus, it is possible to easily absorb any misalignment between the fuel tank and the vehicle body due to the relative movement of the subframe relative to the main frame, and any misalignment between the fuel tank and the vehicle body due to an error upon assembling.

In addition, according to a second aspect and feature of the present invention, there is provided a subframe including left and right side members disposed on the left and right of a fuel tank in a vehicle, left and right suspension brackets vertically extending from the side members for supporting left and right suspension arms, respectively, and a cross member, of an L-shaped section, suspended between the side members and joined to vertical portions and horizontal portions of the suspension brackets.

With the above construction, it is possible not only to enhance the rigidity of the suspension bracket against a load applied thereto from the suspension, but also to prevent a torsional deformation of the side members by a load transmitted thereto through the suspension brackets without an increase in sectional area of the side members.

Further, according to a third aspect and feature of the present invention, there is provided a subframe including left and right side members, disposed on the left and right of a fuel tank, a cross member, for interconnecting the side members, and left and right suspension brackets, for connecting the side members and the cross member at corners formed by the side members and the cross member.

With the above construction, the side members, as well as the cross member and the suspension brackets, can be reinforced by each other, thereby enhancing the rigidity of the subframe without use of a special reinforcing member. Particularly, it is possible to effectively enhance the rigidity against a deformation which may change the angle of the junction between the side member and the cross member. Therefore, when the fuel tank is disposed in the internal space in the subframe, it is possible to protect the fuel tank against the collision at the vehicle rear portion. Moreover, because the suspension bracket is located more inside the vehicle body than the side member, it is possible to sufficiently insure the arm length of the suspension.

Further, the cross member may be joined to the site member near its main frame joining portion. Thus, it is possible to transmit a lateral load, applied from the suspension bracket to the cross member, directly to the main frame, thereby preventing a large moment from being applied to the side member.

Yet further, the cross member may be a rear cross member, and the subframe also includes a front cross member, and the left and right side members and the front and rear cross members may be joined together into the form of a frame, and the suspension brackets may be disposed at four corners of the frame, respectively. Thus, the subframe is formed into a closed shape, free from an opened portion, leading to a further enhanced rigidity. Moreover, when the fuel tank is disposed in an internal space in the subframe, it is possible to make the internal space wide enough to effectively increase the volume of the fuel tank. Further, the distance between the front and rear suspension brackets is large and, hence, it is possible to insure a sufficient span between base ends of the suspension arms mounted to the front and rear suspension brackets, respectively.

The above and other objects, features and advantages will become apparent from the following description of preferred embodiments, taken in conjunction with the accompanying drawings.

BRIEF DESCRIPTION OF THE DRAWINGS

FIGS. 1 to 9 illustrate a first embodiment of the present invention, wherein,

FIG. 1 is a perspective view of the entire subframe assembly;

FIG. 2 is a plan view of the subframe assembly of FIG. 1;

FIG. 3 is a side view taken along an arrow 3—3 in FIG. 2;

FIG. 4 is an enlarged view of an essential portion of the subframe assembly shown in FIG. 2;

FIG. 5 is a view taken along an arrow 5—5 in FIG. 4;

FIG. 6 is a partially perspective view of a subframe;

FIG. 7 is an enlarged view taken along an arrow 7—7 in FIG. 4;

FIG. 8 is an enlarged view taken along an arrow 8–8 in FIG. 2; and

FIG. 9 is an enlarged view taken along an arrow 9—9 in FIG. 8;

FIGS. 10 to 16 illustrate a second embodiment of the present invention, wherein

FIG. 10 is a plan view of a rear portion of a vehicle body;

FIG. 11 is an enlarged view of an essential portion shown at the right in FIG. 10;

FIG. 12 is a side view of the portion shown in FIG. 11 and taken along arrow 12 in FIG. 11;

FIG. 13 is an enlarged view taken in the direction of arrow 13 in FIG. 10;

FIG. 14 is a view of one of the knuckles, taken in the direction of arrow 13, FIG. 13;

FIG. 15 is a view of one of the knuckles taken along an arrow 15 in FIG. 14; and FIG. 16 is a view similar to FIG. 13 for explaining the operation.

DESCRIPTION OF THE PREFERRED EMBODIMENTS

The present invention will now be described by way of preferred embodiments in connection with the accompanying drawings.

FIGS. 1 to 9 illustrate a first embodiment of the present invention. As shown in FIGS. 1 to 7, a subframe SF supports rear suspensions RS, RS which suspend left and right rear wheels of a vehicle. The subframe SF includes a pair of left and right side members 1, 1, a front cross member 2 for interconnecting front ends of the side members 1,1, and a rear cross member 3 for interconnecting rear ends of the side members 1, 1.

Figure 2:
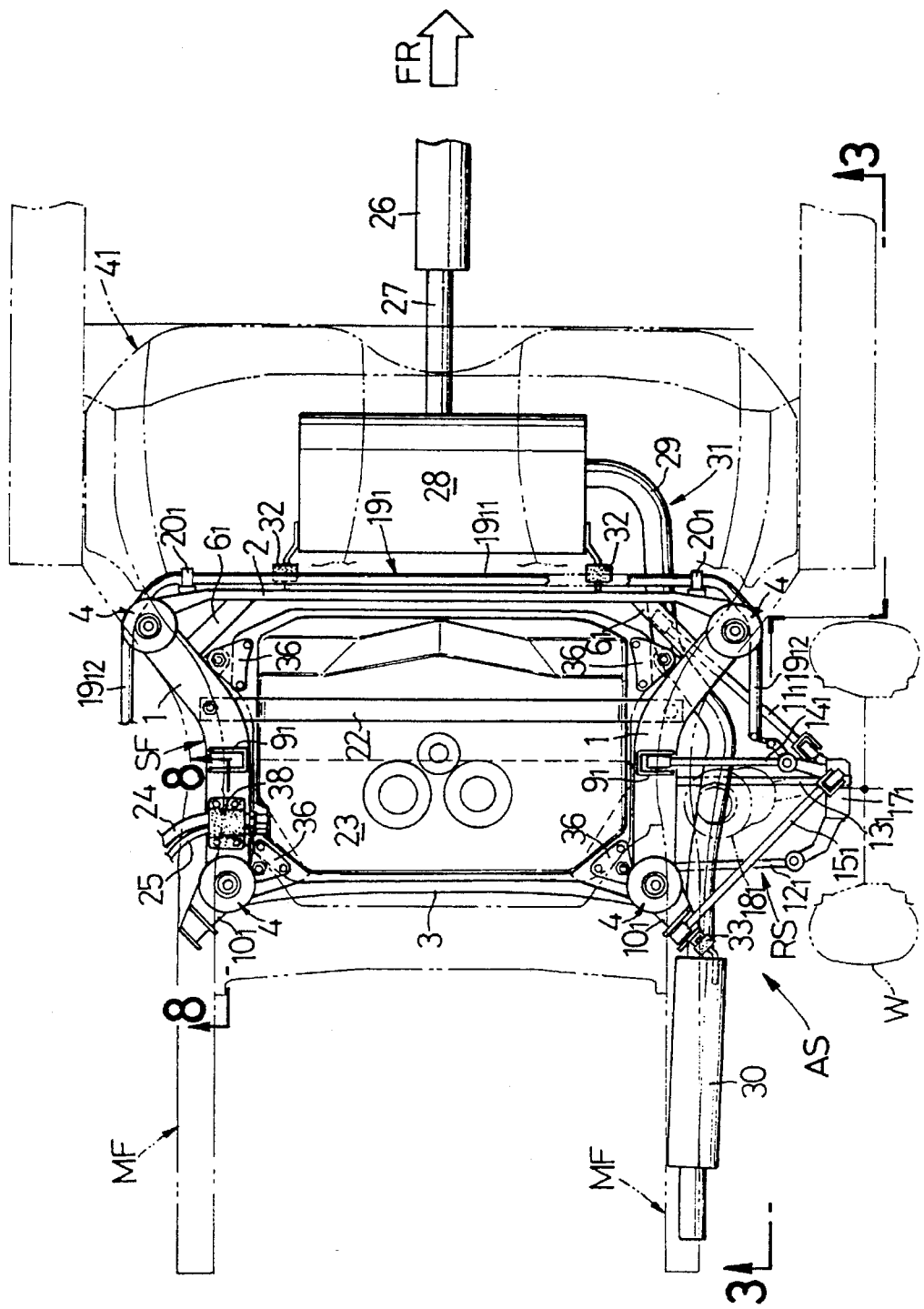
Figure 3:
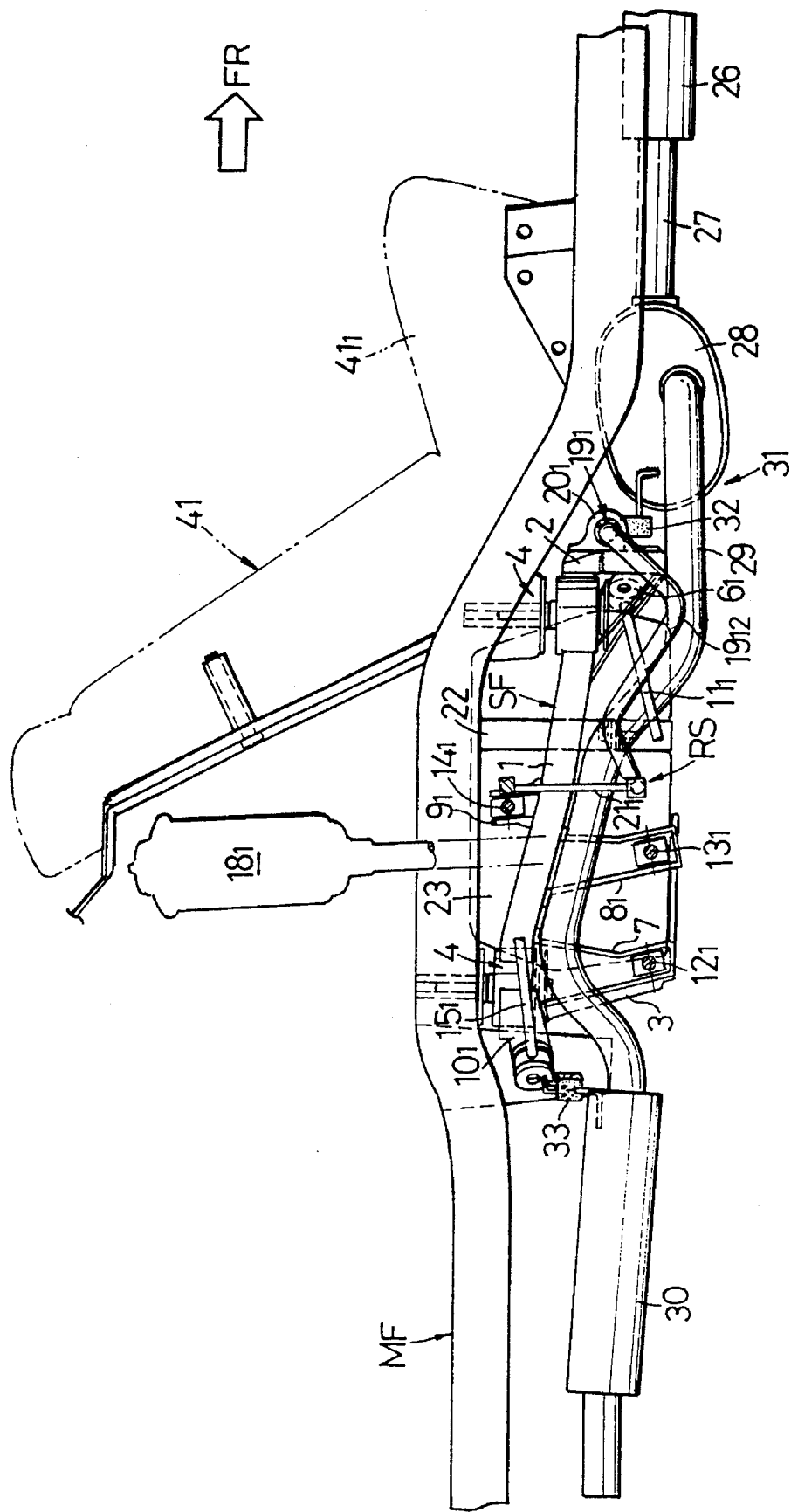

Each of the side members 1, 1 is formed into a sectionally box-like configuration, with a rear portion thereof extending longitudinally of a vehicle body and a front portion thereof being slightly bent toward the outside of the vehicle body, as viewed in a plane (see FIG. 2), and with a front end thereof curved to be slightly lower in level than a rear end, as viewed from the side (see FIG. 3).

The front and rear ends of the side members 1, 1 are coupled to outer sleeves 5 of four rubber bush mounts 4, respectively, and left and right ends of the front cross member 2 extending laterally of the vehicle body are coupled to the outer sleeves 5, 5 of the two front rubber bush mounts 4, 4. The front cross member 2 is a member of a U-shaped section, FIG. 6, with its front surface opened. The opened front surface is occluded with a reinforcing member $2_1$, $2_1$, FIGS. 5 and 6, in the vicinity of left and right ends excluding a central portion thereof. Portions of the side members 1, 1, near their front ends, are coupled to portions of the front cross member 2, near its left and right ends, by trailing arm brackets $6_1$, $6_1$ of a U-shaped section with their lower surfaces opened.

Figure 5:
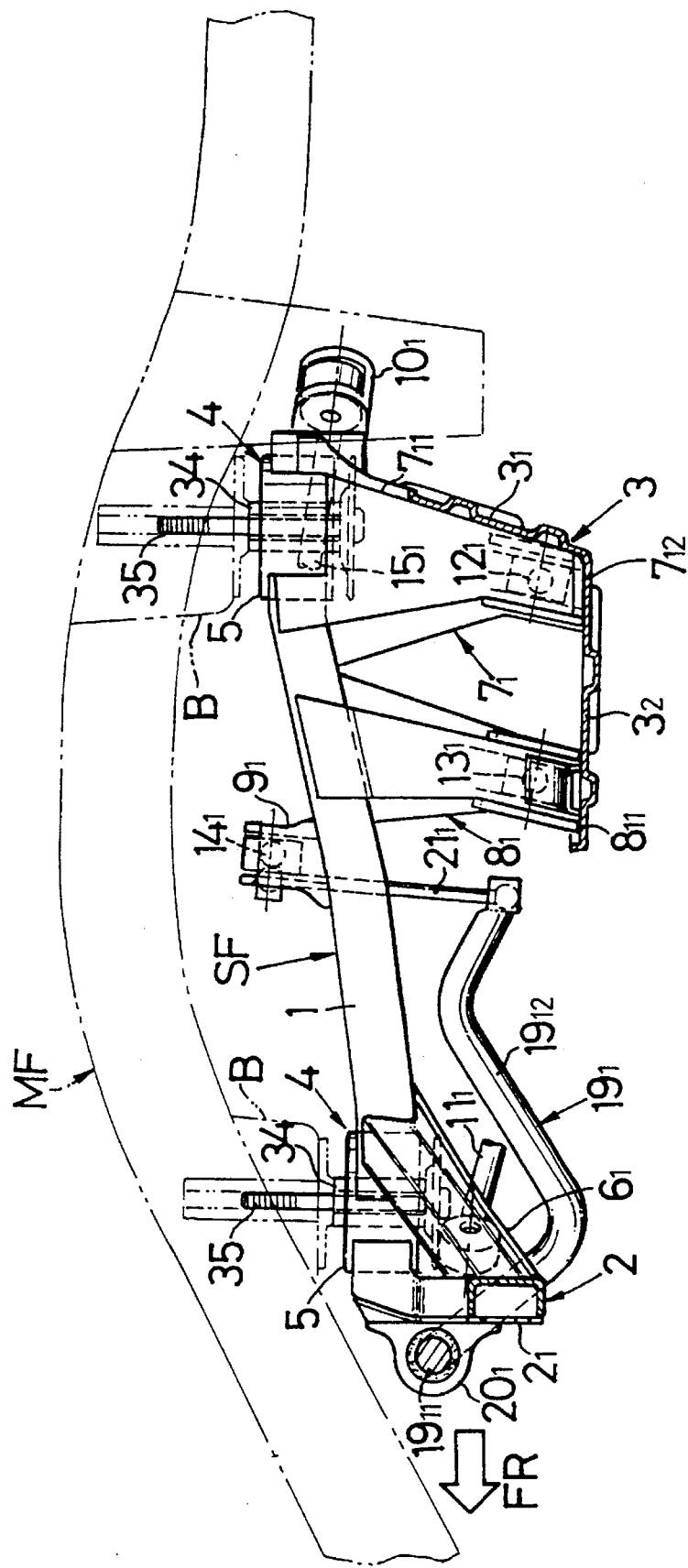

Left and right ends of the rear cross member 3, extending laterally of the vehicle body are coupled to the outer sleeves 5, 5 of the two rear rubber bush mounts 4, 4, FIG. 5, coupled to the rear ends of the side members 1, 1. The rear cross member 3 is a member of an L-shaped section having a vertical portion $3_1$ and a horizontal portion $3_2$ (see FIGS. 3 and 5) and is coupled, at an upper end of its vertical portion $3_1$, to the outer sleeves 5, 5.

Figure 6:
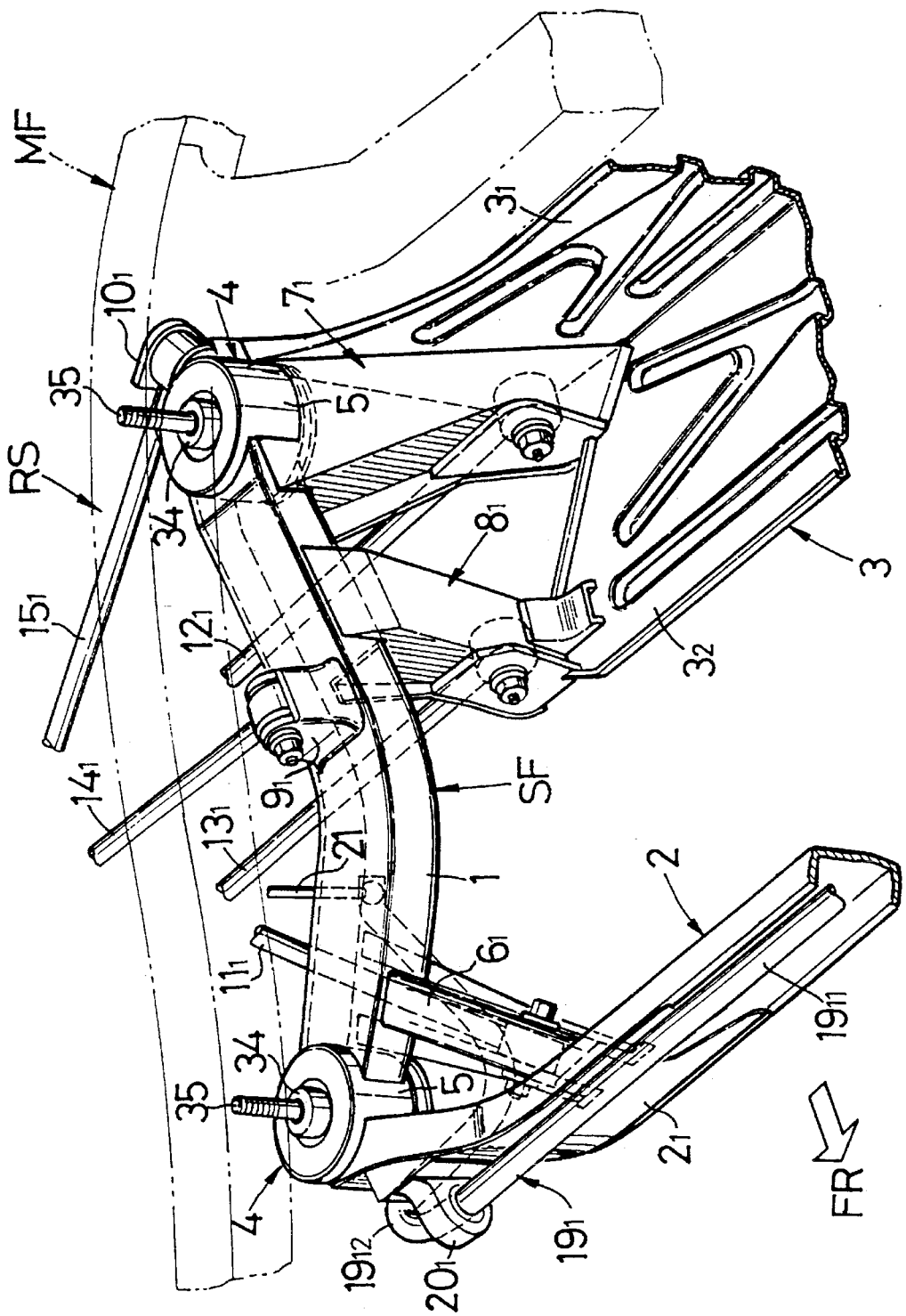

Upper ends of control arm brackets $7_1$, $7_1$, with their outer surfaces, as viewed laterally of the vehicle body, being opened, are coupled to the outer sleeves 5, 5 of the two rear rubber bush mounts 4, 4, FIG. 6. Each of the control arm brackets $7_1$, $7_1$ extends substantially vertically, with a rear-side vertical portion $7_{11}$ thereof, FIG. 5, being coupled to the vertical portion $3_1$ of the rear cross member 3, and with a horizontal portion $17_{12}$, located at its lower end, coupled to the horizontal portion $3_2$ of the rear cross member 3 (see FIGS. 3, 5 and 6).

Each of the rubber bush mounts 4 is resiliently coupled to corresponding one of the inner sleeves 34, FIG. 5, with an annular rubber bush (not shown) interposed therebetween inside of each of the outer sleeves 5. Bolts 35, extending through the inner sleeves 34, are threadedly inserted into a pair of main frames MF, MF, FIG. 2, extending on laterally opposite sides of the vehicle.

Each of upper ends of downwardly extending lower arm brackets $8_1$, $8_1$, FIGS. 3, 5 and 6, is coupled to a lower surface of each of the side members 1, 1 at a location displaced from its central portion toward its rear end. Each of the lower arm brackets $8_1$, $8_1$ is a member of a U-shaped section with an outer surface, as viewed laterally of the vehicle, being opened, and has a horizontal portion located at its lower end and coupled to the horizontal portion $3_2$ of the rear cross member 3.

Further, upper arm brackets $9_1$, $9_1$, FIGS. 2, 5 and 6 are mounted on upper surfaces of central portions of the side members 1, 1, respectively. And leading arm brackets $10_1$, $10_1$ are mounted on rear surfaces of the two rear rubber bush mounts 4, 4, respectively.

Trailing arms $11_1$, $11_1$, control arms $12_1$, $12_1$, lower arms $13_1$, $13_1$, upper arms $14_1$, $14_1$ and lead arms $15_1$, $15_1$, FIGS. 2, 3, 4 and 5, of the rear suspension RS, RS are connected to the trailing arm brackets $6_1$, $6_1$, the control arm brackets $7_1$, $7_1$, the lower arm brackets $8_1$, $8_1$, the upper arm brackets $9_1$, $9_1$ and the leading arm brackets 10, 10, respectively. A tip end of each of the arms is connected to one of knuckles $17_1$, $17_1$ supporting axles 16, 16, FIGS. 1, 2 and 4. The knuckles $17_1$, $17_1$ and the vehicle body B (See FIG. 8) are interconnected through dampers $18_1$, $18_1$, FIGS. 1, 2, 3 and 4, respectively.

Figure 1:
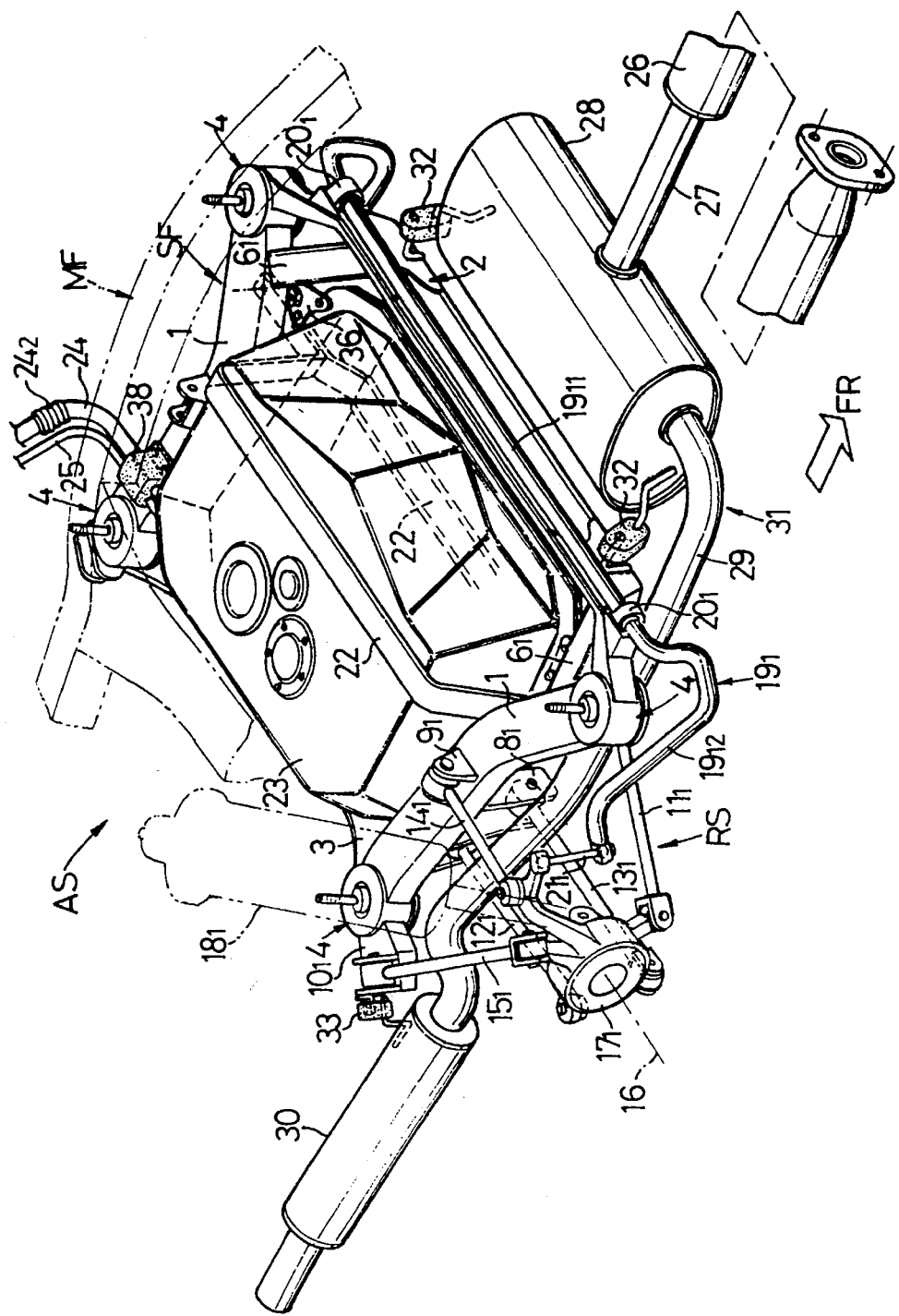

The control arms $12_1$, $12_1$, the lower arms $13_1$, $13_1$ and the upper arms $14_1$, $14_1$, FIG. 1, extend substantially parallel to one another and each functions as a lateral arm.

Figure 4:
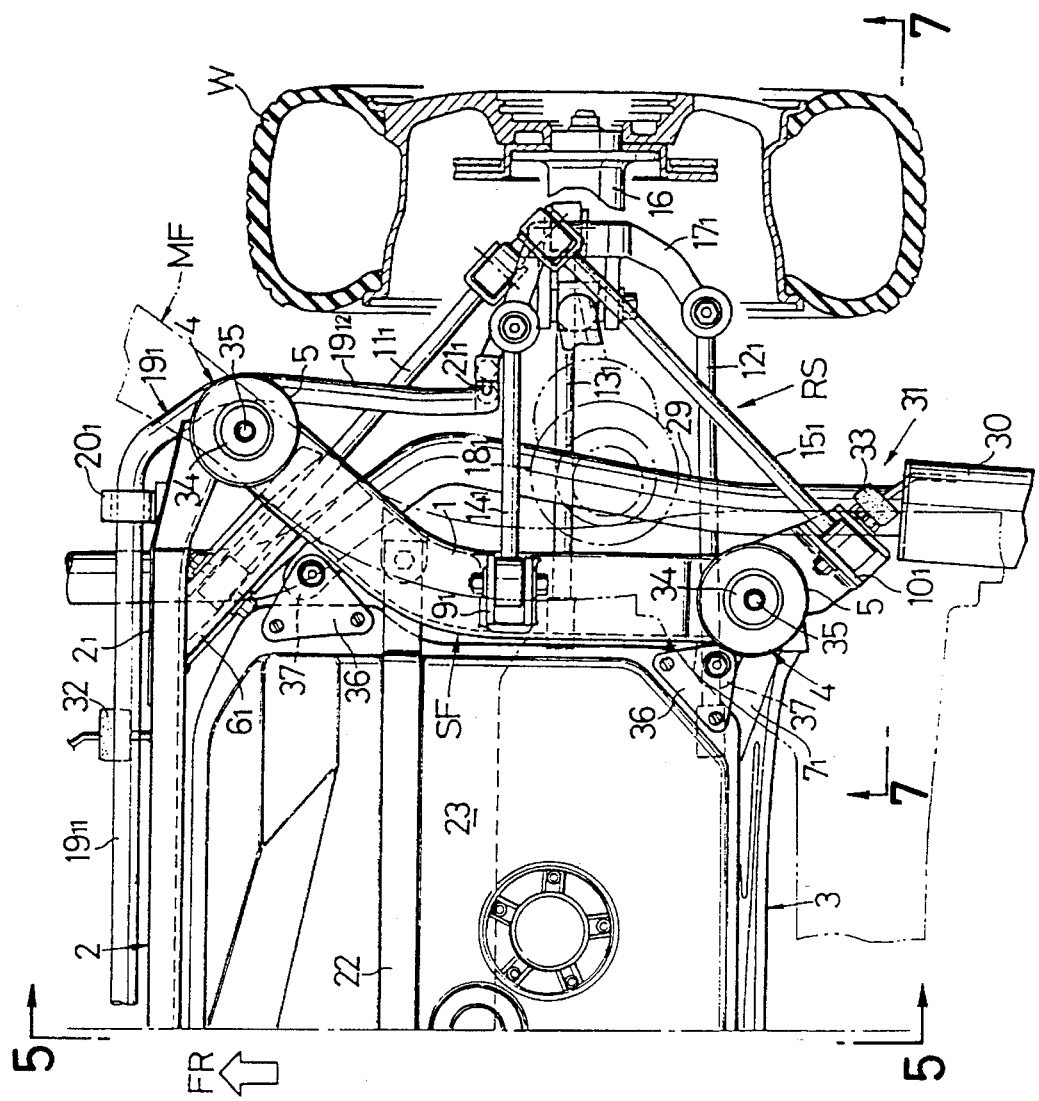

Left and right ends of a torsion portion $19_{11}$ of a stabilizer $19_1$ are resiliently supported on a front surface of the front cross member 2 through a pair of stabilizer supporting members $20_1$, $20_1$, FIGS. 2, 4 and 6. Tip ends of a pair of arm portions $19_{12}$, $19_{12}$, extending rearwardly of the vehicle body from left and right ends of the torsion portion $19_{11}$, are connected to portions of the knuckles $17_1$, $17_1$ in the vicinity of arm mounting portions through vertically extending stabilizer links $21_1$, and $21_1$, FIG. 4.

A front portion of the subframe SF is wider laterally, as compared with a rear portion thereof. The stabilizer $19_1$ is disposed to outwardly bypass the two front rubber bush mounts 4, 4 mounted at a widest portion of the subframe SF, FIG. 2. Therefore, the length of the torsion portion $19_{11}$ can be insured to the maximum to provide a sufficient resisting force against a torsion. Moreover, by mounting the torsion portion $19_{11}$ along the front surface of the front cross member 2, the space for disposition of the torsion portion $19_{11}$ can be suppressed to the minimum, and an influence cannot be exerted to the capacity of a fuel tank 23 located at the rear portion of the front cross member 2. In addition, since the pair of stabilizer supporting members $20_1$, $20_1$ for supporting the stabilizer $19_1$ are mounted in the vicinity of portions of the subframe SF which are supported by the front rubber bush mounts 4, 4, the rigidity of the subframe SF, in the vicinity of mounting portions of the stabilizer supporting members $20_1$, $20_1$, can be enhanced to firmly support the stabilizer $19_1$.

The fuel tank 23 is supported in a space defined by the side members 1, 1, the front cross member 2 and the rear cross member 3 of the subframe SF, by means of two upper and lower bands 22, 22 fixed at their left and right ends to the lower surface of the side members 1, 1, FIGS. 2, 3 and 4. Further, four corners of the fuel tank 23 are fixed to fuel tank supporting brackets 37 mounted on the left and right side members 1, 1 through triangular connecting members 36, respectively. By supporting the fuel tank 23 inside the frame-like subframe SF, it is possible not only to insure the volume of the fuel tank 23 to the maximum, but also to protect the fuel tank 23 by the subframe SF upon collision of the vehicle.

Figure 8:
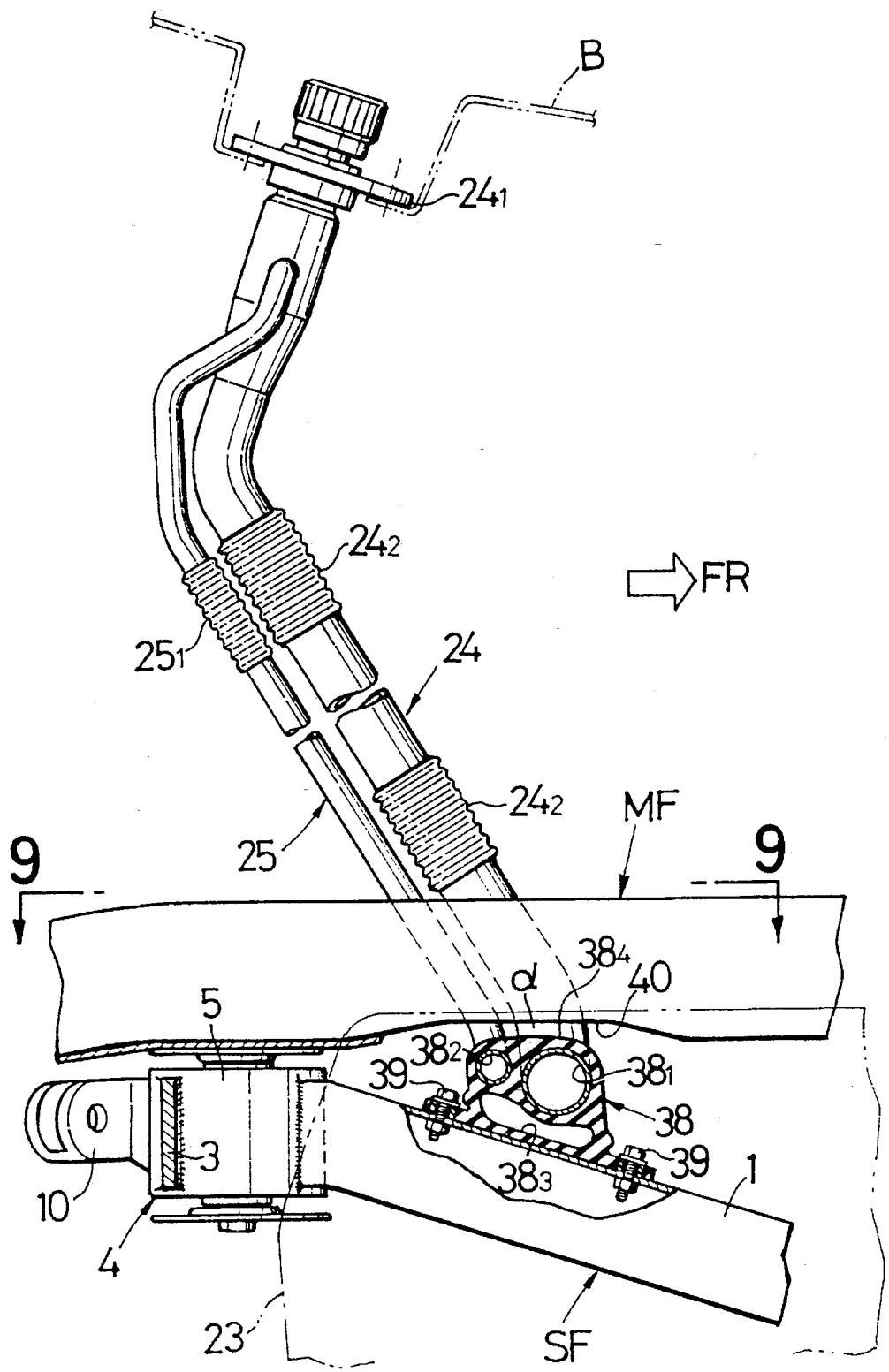
Figure 9:
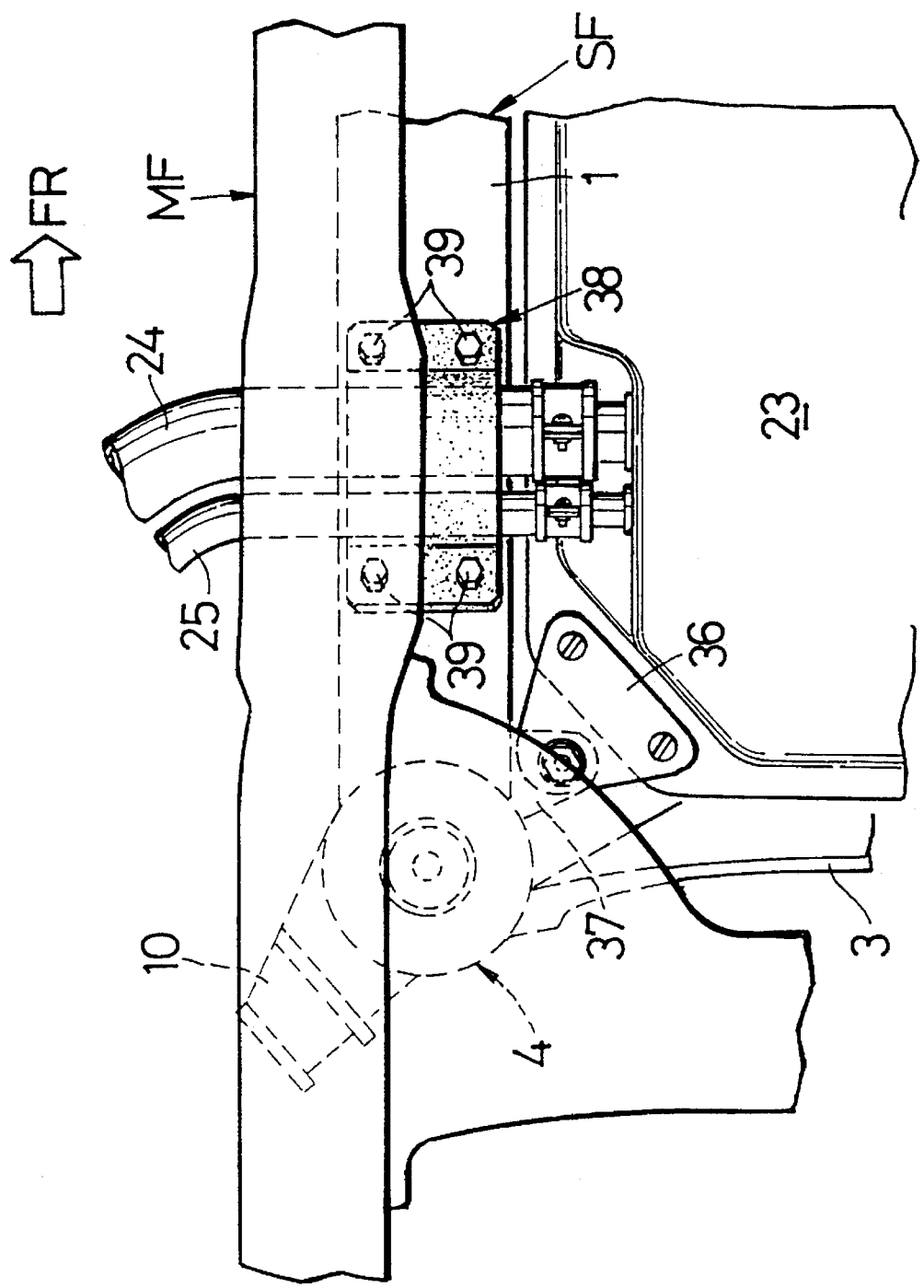

As can be seen also from FIGS. 8 and 9, a filler pipe 24 and a breather pipe 25 extending outwardly of the vehicle body from a left side of a rear portion of the fuel tank 23 are passed between the upper surface of the left side member 1 of the subframe SF and the lower surface of the left main frame MF and then risen upwardly. An upper end of the breather pipe 25 is connected to the filler pipe 24 in the vicinity of its upper end, and a flange $24_1$, provided at the upper end of the filler pipe 24, is fixed to the vehicle body B.

A recess 40, FIG. 8, is defined on the lower surface of the main frame MF opposed to the filler pipe 24 and the breather pipe 25 to bring the positions of mounting of the filler pipe 24 and the breather pipe 25 to the fuel tank 23 to a level as high as possible. The height of the opened end of the breather pipe 25 within the fuel tank is an upper limit of a liquid level in the fuel tank 23 and hence, the substantial volume of the fuel tank 23 is defined by the height of the opened end of the breather pipe 25. Thus, the height of the position of mounting of the breather pipe 25 (namely, the height of opened end of the breather pipe 25 within the fuel tank 23) can be brought to a high level by defining the recess 40 on the lower surface of the main frame MF to effectively utilize the internal volume of the fuel tank 23. It should be noted that a portion of the main frame MF mounted in the recess 40 is formed wider than front and rear portions thereof (see FIG. 9) in order to prevent the height of the main frame MF by the recess 40 from being lowered to reduce the strength, thereby causing the strength of the main frame MF to be equalized lengthwise.

The subframe SF supported on the left and right main frames, MF, MF through the rubber bush mounts 4, FIG. 2, is movable relative to the main frames MF, MF by loads received from the rear suspensions RS, RS, or the like. But the tip ends of the filler pipe 24 and the breather pipe 25 fixed to the vehicle body B integral with the main frames MF, MF are not movable. Thereupon, in order to absorb the relative movement between the fuel tank 23 and the tip ends of the filler pipe 24 and the breather pipe 25, two bellows portions $24_2$, $24_2$, FIG. 8, are formed on the filler pipe 24, and a single bellows portion $25_1$ is formed on the breather pipe 25. The bellows portions $24_2$, $24_2$ and $25_1$ have a function to absorb a misalignment between the tip ends of the filler pipe 24 and the breather pipe 25 due to an error, when the subframe SF supporting the fuel tank 23 is mounted on the main frames MF, MF.

A rubber resilient member 38, FIG. 8, for supporting the filler pipe 24 and the breather pipe 25 is mounted to the upper surface of the left side member 1 opposed to the lower surface of the left main frame MF by four bolts 39. The resilient member 38 is provided with a filler pipe supporting bore $38_1$ through which the filler pipe 24 is passed, a breather pipe supporting bore $38_2$ through which the breather pipe 25 is passed, and a longitudinally extending lightening bore $38_3$. A predetermined clearance α is defined between a top surface $38_4$ of the resilient member 38 and the recess 40 of the main frame MF.

Since the filler pipe 24, and the breather pipe 25, extending from the fuel tank 23, are supported in a stable manner on the subframe SF by the resilient member 38, there is provided an enhanced workability in attaching the subframe SF to the main frame MF, MF along with the fuel tank 23. In addition, even if the subframe SF is vertically moved by a load from the rear suspensions RS, RS, the top surface $38_4$ of the resilient member 38 is brought into abutment against the lower surface of the main frame MF, thereby preventing the filler pipe 24 and the breather pipe 25 from directly interfering with the main frame MF. Even when the amount of subframe SF moved vertically is large, the lightening bore $38_3$ in the resilient member 38 can be compressed vertically to absorb the load, thereby preventing a fracture of the filler piper 24 and the breather pipe 25.

As can be seen from FIGS. 1 to 3, an exhaust system 31 is supported on the subframe SF. The exhaust system 31 includes a front expansion chamber 26, detachably coupled to a rear end of an exhaust pipe extending from an engine, a front exhaust pipe 27, a main expansion chamber 28, a rear exhaust pipe 29 and a rear expansion chamber 30. The front expansion chamber 26 and the front exhaust pipe 27 are disposed to extend along a center line of the vehicle body. The main expansion chamber 28, connected to a rear portion of the front exhaust pipe 27, is disposed laterally to extend along the front surface of the cross member 2 below a seat portion $41_1$ of a seat 41, FIG. 3, and is supported in a hung manner on the front cross member 2 with a pair of left and right resilient members 32, 32, FIG. 1, interposed therebetween. The rear exhaust pipe 29 extending rearwardly from a right end of the main expansion chamber 28 passes below and through the right side of the right side member 1 and then extends rearwardly. The rear expansion chamber 30, connected to a rear end of the rear exhaust pipe 29, is supported in a hung manner on the right leading arm bracket $10_1$ through a resilient member 33.

By disposing the rear exhaust pipe 29 below and on the right side of the right side member 1 in the above manner, it is possible, not only to avoid an interference of the fuel tank 23 supported inside the subframe SF with the rear exhaust pipe 29 to sufficiently insure the volume of the fuel tank 23, but also to eliminate the need for formation of a notch, or the like in the subframe SF, for permitting passage of the rear exhaust pipe 29 thereby insuring a strength of the subframe SF. In addition, by supporting the exhaust system 31 on the subframe SF in front and in rear of the right rear suspension RS, the relative position of such rear suspension RS and the exhaust system 31 can be maintained accurately to prevent an interference between them.

Figure 7:
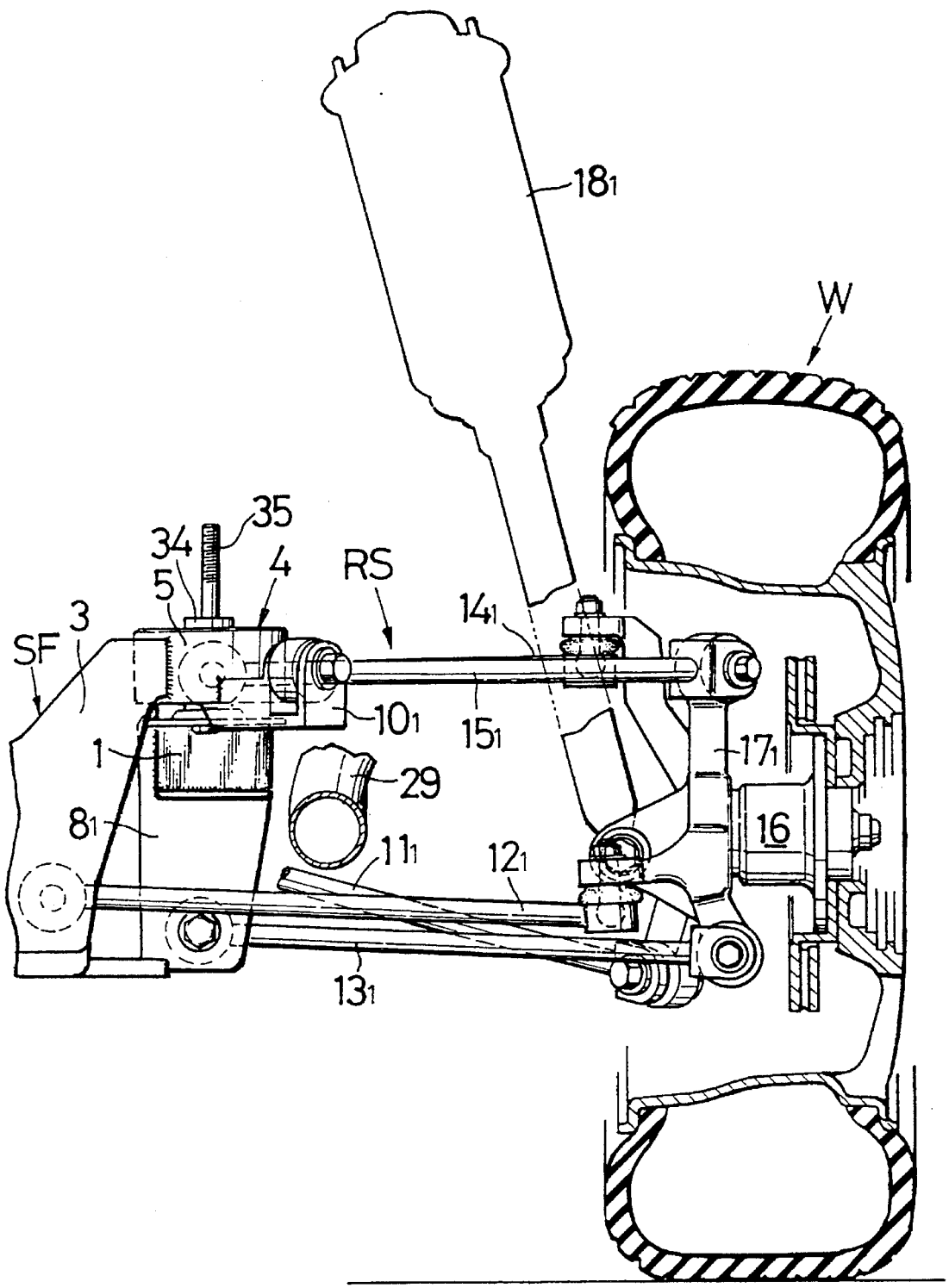

As can be seen from FIGS. 6 and 7, the rear exhaust pipe 29 extends rearwardly through a clearance defined between the upper suspension arm section (the upper arm $14_1$ and the leading arm $15_1$) and the lower suspension arm section (the trailing arm $11_1$, the control arm $12_1$ and the lower arm $13_1$) of the right rear suspension RS. Such layout of the rear exhaust pipe 29 eliminates the need for each of the suspension arm sections to be curved in order to avoid an interference with the rear exhaust pipe 29, thereby maintaining the rigidity of the suspension arm sections.

Additionally, by supporting the rear portion of the exhaust system 31 on the right sidle of the rear portion of the subframe SF by the resilient member 33, and by supporting the filler pipe 24 and the breather pipe 25 on the left side of the rear portion of the subframes SF by the resilient member 38, it is possible to preserve the lateral weight balance of a subframe assembly AS. Further, by supporting the front portion of the exhaust system 31 on the front and central portion of the subframe SF by the pair of resilient members 32, 32, it is possible to preserve the longitudinal weight balance of the subframe assembly AS. As a result, the position of the center of gravity of the subframe assembly AS can be matched with a central portion thereof to provide an improved weight balance, thereby improving the workability in mounting the subframe assembly AS on the main frames MF, MF and equalizing the load applied to the four rubber bush mounts 4.

Moreover, because the seat portion $41_1$ of the seat 41, FIG. 3, is disposed in front of the front cross member 2 of the subframe SF, the volume of the fuel tank 23 supported in the subframe SF cannot be influenced by the seat 41. Further, because the main expansion chamber 28, extending laterally along the front surface of the front cross member 2, is disposed utilizing a waste space below the seat portion $41_1$ of the seat 41, the volume of the main expansion chamber 28 can be sufficiently insured while retreating the seat 41 to a location in proximity to the subframe SF to maintain a wide compartment.

The subframe assembly AS is formed by integrally assembling the left and right rear suspensions RS, RS, the fuel tank 23 and the exhaust system 31 to the subframe SF. The subframe assembly is mounted to the pair of left and right main frames MF, MF through the four front, rear, left and right rubber bush mounts 4. In this case, the number of assembling steps can be reduced substantially by previously sub-assembling the subframe assembly AS and collectively mounting it to the main frames MF, MF. It will be appreciated that members to be assembled as components of the subframe assembly AS to the subframe SF can be changed or added depending upon the type of the vehicle.

A load, received by the rear wheels W, W from a road surface during traveling of the vehicle, is applied via the rear suspensions RS, RS to the subframe SF mounted to the main frame MF, MF by the four rubber bush mounts 4. However, the subframe SF is formed into a frame-like configuration by the left and right side members 1, 1 and front and rear cross members 2 and 3, and the two front corners are reinforced by the trailing arm brackets $6_1$, $6_1$ and the two rear corners are reinforced by the control arm brackets $7_1$ and $7_1$. Therefore, each of the portions of the subframe SF, near the corners, has an extremely high rigidity. Therefore, when the load from the rear suspension RS is applied to the subframe SF, it is possible to effectively prevent a deformation which may distort a planar shape of the subframe SF by changing the coupling angle of the corners. Moreover, upon collision of the vehicle, it is possible to effectively protect the fuel tank 23 by the subframe SF having the high rigidity.

As particularly shown in FIG. 5, the vertical portions $7_{11}$, $7_{11}$, and the horizontal portions $7_{12}$, $7_{12}$ of the control arm brackets $7_1$, $7_1$ are coupled to the vertical portion $3_1$ and the horizontal portion $3_2$ of the rear cross member 3, at the rear corners of the subframe SF, respectively. And the front end of the horizontal portion $3_2$ of the rear cross member 3 is coupled to the horizontal portions $8_{11}$, $8_{11}$ of the lower arm brackets $8_1$, $8_1$. Therefore, the rigidity of portions of the side members 1, 1 and the rear cross member 3, near their junctions, is further enhanced. Therefore, when a load is applied from the control arms $12_1$, $12_1$ and the lower arms $13_1$, $13_1$ to the lower portions of the vertically extending control arm brackets $7_1$, $7_1$ and to the lower portions of the vertically extending lower arm brackets $8_1$, $8_1$, it is possible to prevent a failure of the control arm brackets $7_1$, $7_1$ and the lower arm brackets $8_1$, $8_1$ and to prevent a torsional deformation of the side members 1, 1.

In addition, because the control arm brackets $7_1$, $7_1$ and the lower arm brackets $8_1$, $8_1$ are mounted on the subframe SF in the vicinity of the rubber bush mounts 4, which are coupling portions to the main frames MF, MF, the load from the control arm brackets $7_1$, $7_1$, and the lower arm brackets $8_1$, $8_1$, is transmitted through the rubber bush mounts 4 directly to the main frames MF, MF. Therefore, a large bending moment cannot be applied to the side members 1, 1 and the front and rear cross members 2 and 3.

Yet further, because the trailing arm brackets $6_1$, $6_1$ and the control arm brackets $7_1$, $7_1$ are mounted at the front and rear ends of the subframe SF, it is possible to insure a sufficient span between a base end of each of the trailing arm brackets $6_1$, $6_1$ and a base end of each of the control arm brackets $7_1$, $7_1$. Moreover, because the trailing arm brackets $6_1$, $6_1$ and the control arm brackets $7_1$, $7_1$ are mounted more inside the vehicle body than the side members 1, 1, it is possible to insure sufficient arm length of each of the trailing arms $11_1$, $11_1$ and the control arms $12_1$ and $12_1$.

A second embodiment of the present invention will now be described in connection with FIGS. 10 to 16, wherein the same parts or components as in the first embodiment are designated by the same reference characters.

Figure 10:
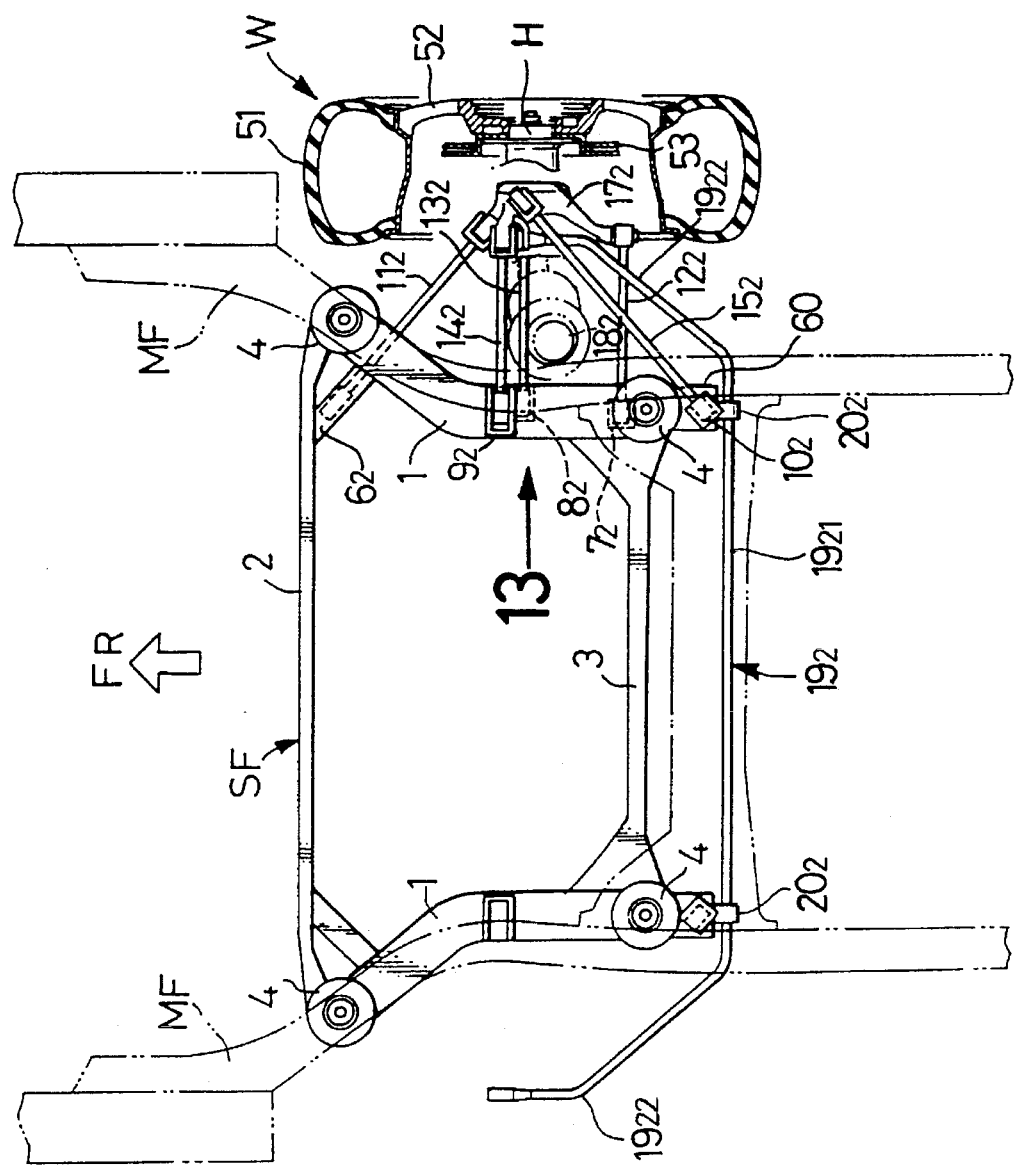

As shown in FIG. 10, a subframe SF supports rear suspensions RS, RS which suspend left and right rear wheels W, W of a front drive vehicle. The subframe SF includes a pair of left and right side members 1, 1, a front cross member 2 for interconnecting front ends of the side members 1, 1, and a rear cross member 3 for interconnecting rear ends of the side members 1, 1. Four rubber bush mounts 4 are mounted at the front and rear ends of the side members 1, 1, respectively. And the subframe SF is supported on main frames MF by the rubber bush mounts 4.

The left and right rear suspensions RS, RS have the same structure and hence, the structure of the right rear suspension will be described below.

Figure 11:
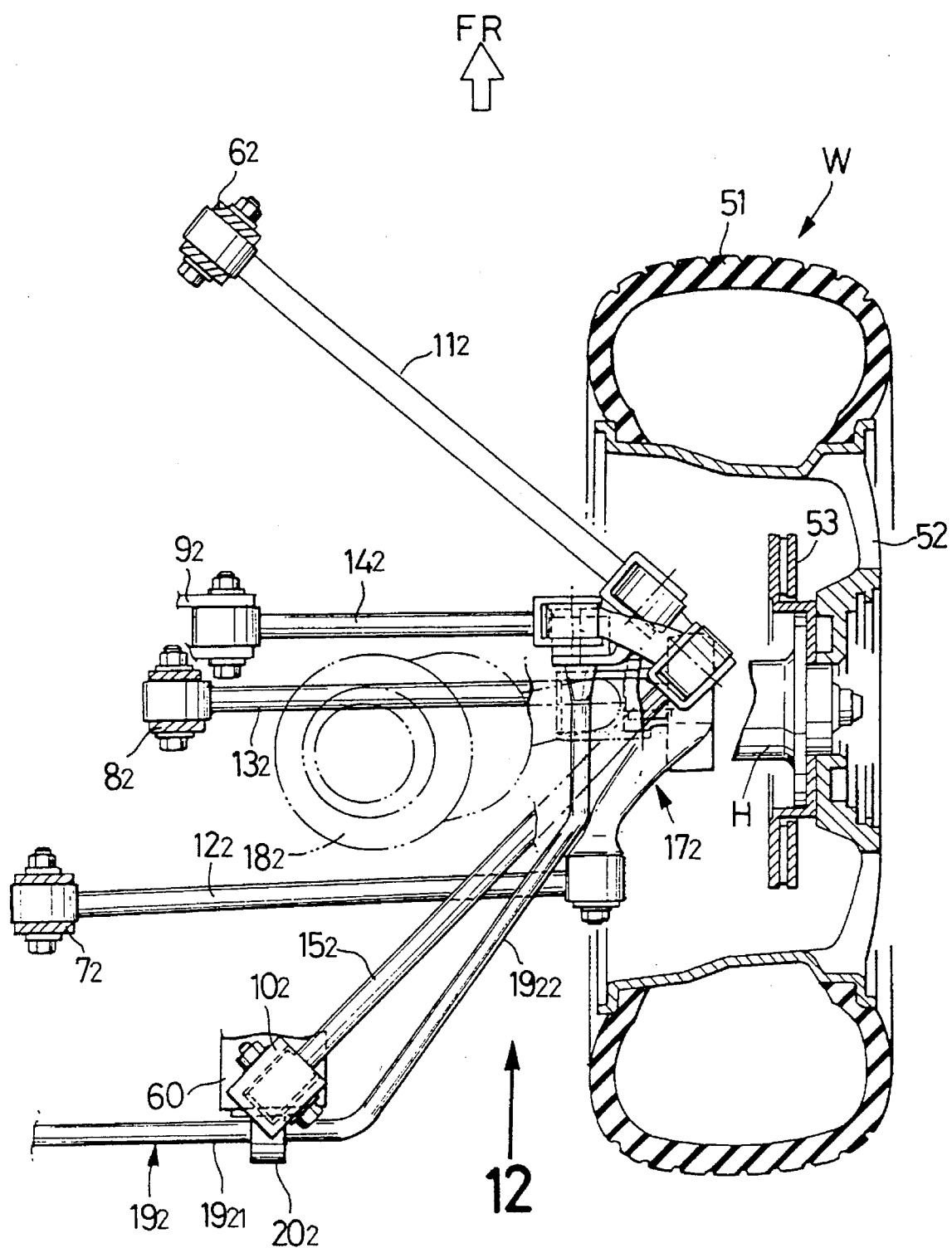
Figure 12:
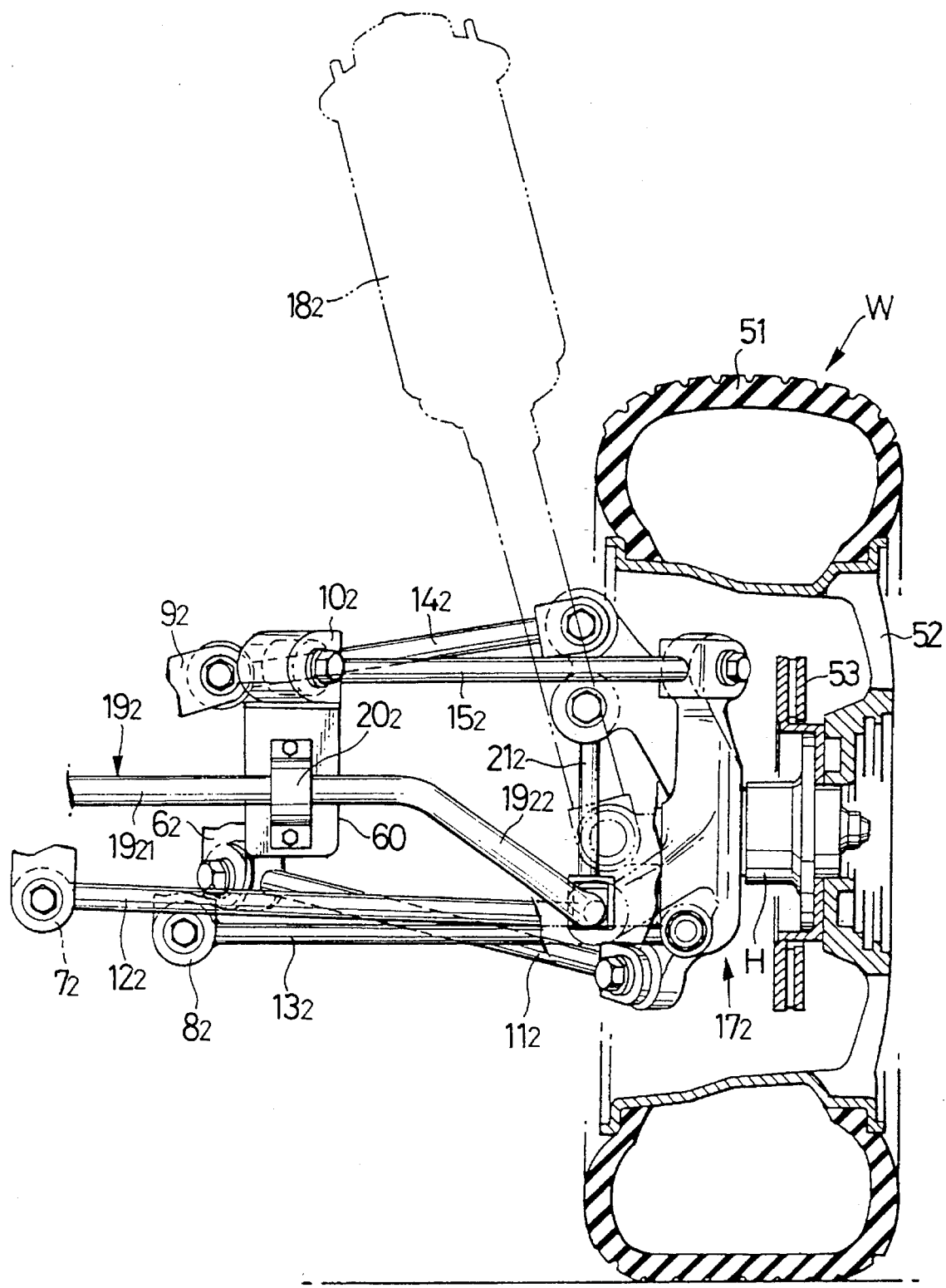
Figure 13:
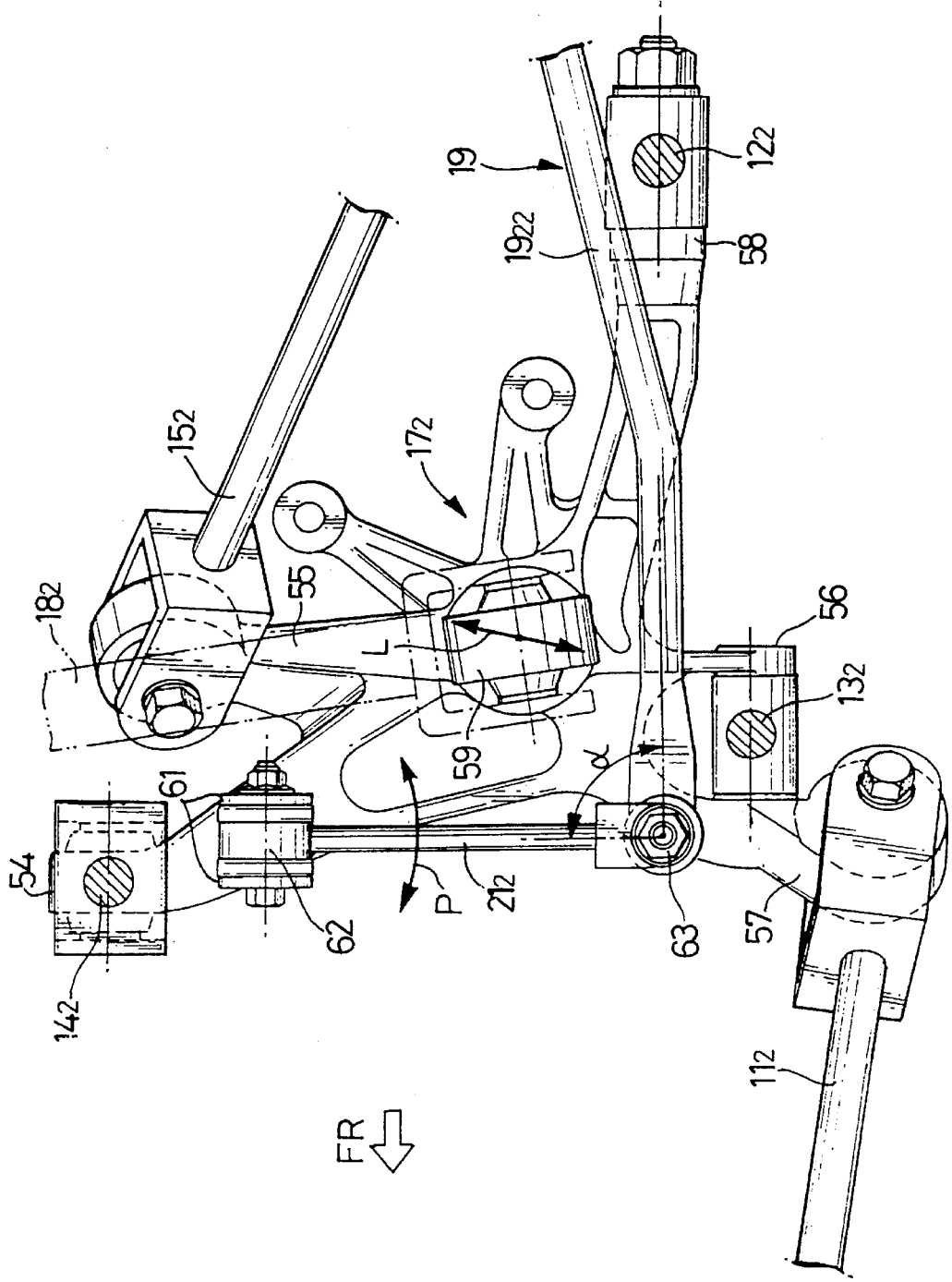

As can be seen by reference also to FIGS. 11 to 13, the rear wheel W including a tire 51, a wheel member 52 and a brake disk 53, and is rotatably supported on an axle 16 (see FIG. 15) integral with a knuckle $17_2$ through a hub H of the wheel member 52. Outer and inner ends, of an upper arm $14_2$, are connected, through resilient joints, to an upper arm-mounting arm 54 projecting upwardly from the knuckle $17_2$ and an upper arm bracket $9_2$ mounted on the subframe SF, respectively. Outer and inner ends of lead arm $15_2$ are connected, through resilient joints, to a leading arm-mounting arm 55 projecting upwardly from the knuckle $17_2$ and a leading arm bracket $10_2$ mounted on the subframe SF, respectively. The upper arm $14_2$ and the leading arm $15_2$ are disposed above the axle 16. As viewed in a plane (FIG. 11), the upper arm $14_2$ extends laterally of the vehicle body, while the leading arm $15_2$ extends forwardly outwardly of the vehicle body from a rear inside of the vehicle body.

An outer end of a lower arm $13_2$ is connected, through a resilient joint, between a lower arm-mounting arm 56 projecting downwardly of the knuckle $17_2$ and a trailing arm-mounting arm 57, FIG. 13, which will be described hereinafter. An inner end of the lower arm $13_2$ is connected, through a resilient joint, to a lower arm bracket $8_2$, FIG. 11, mounted on the subframe SF. Outer and inner ends of a trailing arm $11_2$ are connected, through resilient joints, to the trailing arm-mounting arm 57, projecting downwardly from the knuckle $17_2$, and a trailing arm bracket $6_2$ mounted on the subframe SF, respectively. The lower arm $13_2$ and the trailing arm $11_2$ are disposed below the axle 16. As viewed in a plane (FIG. 11), the lower arm $13_2$ extends laterally of the vehicle body, while the trailing arm $11_2$ extends rearwardly outwardly of the vehicle body from a front inside of the vehicle body.

Outer and inner ends of a control arm $12_2$, FIG. 11, are connected, through resilient joints, to a control arm-mounting arm 58 projecting rearwardly of the vehicle body from the knuckle $17_2$ and a control arm bracket $7_2$ mounted on the subframe SF, respectively. The control arm $12_2$ extends laterally of the vehicle body.

A damper $18_2$, FIGS. 10 and 12, is supported at its upper end on the vehicle body and connected at its lower end to a damper mounting arm 59 projecting from the knuckle $17_2$ on an opposite side from the axle 16.

As can be best seen in FIG. 10, a stabilizer $19_2$ connecting left and right knuckles $17_2$ includes a torsion portion $19_{21}$ extending laterally of the vehicle body, and a pair of left and right arm portions $19_{22}$, $19_{22}$ which extend forwardly of the vehicle body from left and right ends of the torsion portion $19_{21}$, respectively. The torsion portion $19_{21}$ of the stabilizer $19_2$ is resiliently supported in the vicinity of its left and right ends on a pair of left and right brackets, 60, 60 mounted at the rear ends of the left and right side members 1, 1 of the subframe SF through stabilizer supporting members $20_2$, $20_2$, respectively.

As can be seen from FIG. 13, a stabilizer arm-mounting arm 61 integrally formed on an intermediate portion of the upper arm-mounting arm 54 of the knuckle $17_2$ and a front end of the arm portion $19_{22}$ of the stabilizer $19_2$ are connected through rubber bush joints 62 and 63 to upper and lower ends of a vertically extending stabilizer link $21_2$. When the knuckle $17_2$ is in a neutral position, in which it is not moved vertically, an angle formed by the vertically extending stabilizer link $21_2$ and the arm portion $19_{22}$ extending longitudinally of the vehicle body is set at a substantially right angle $\alpha$ which is an angle enabling the torsion portion $19_{21}$ of the stabilizer 19 to be torsionally deformed most effectively.

Figure 14:
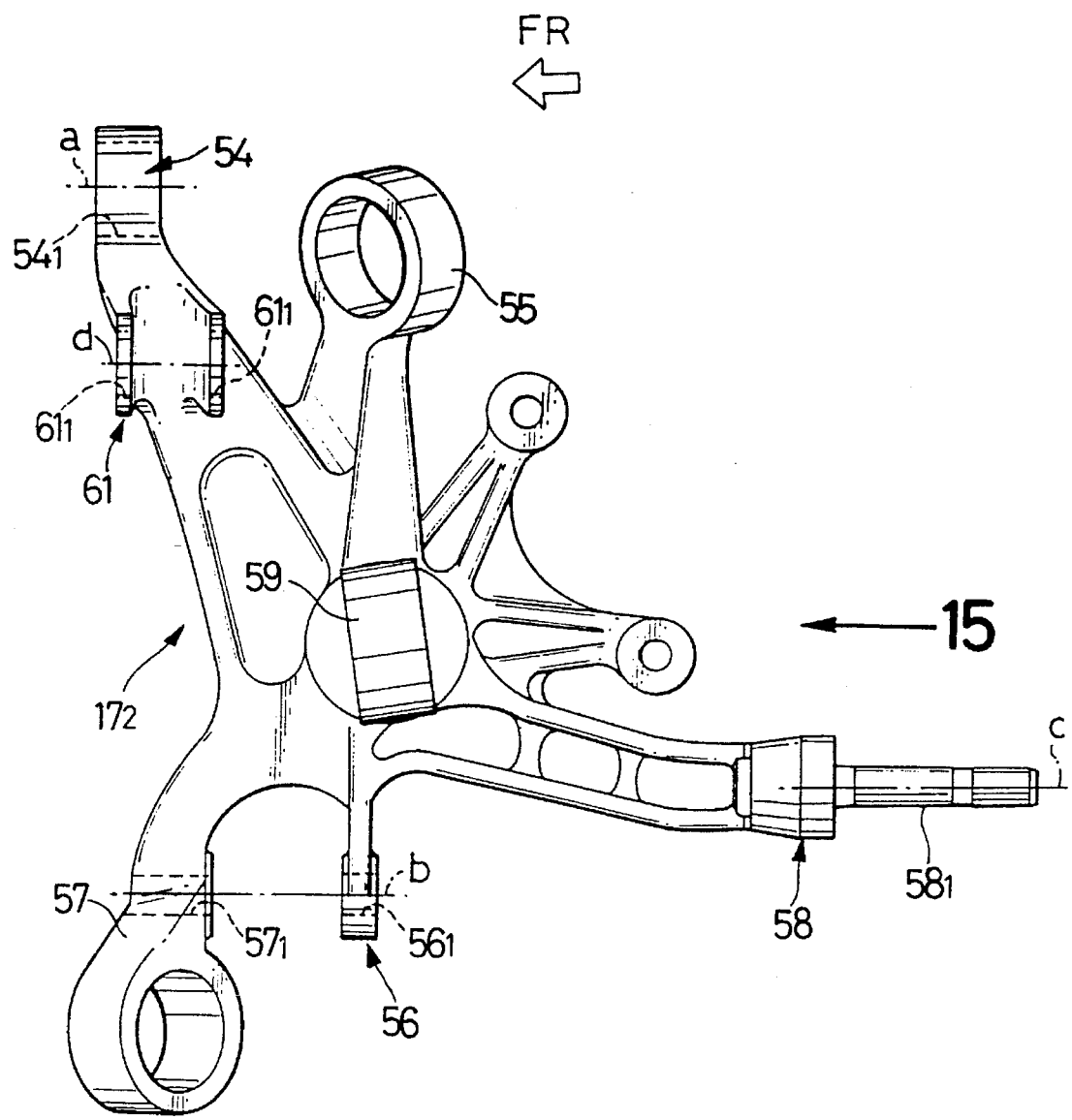
Figure 15:
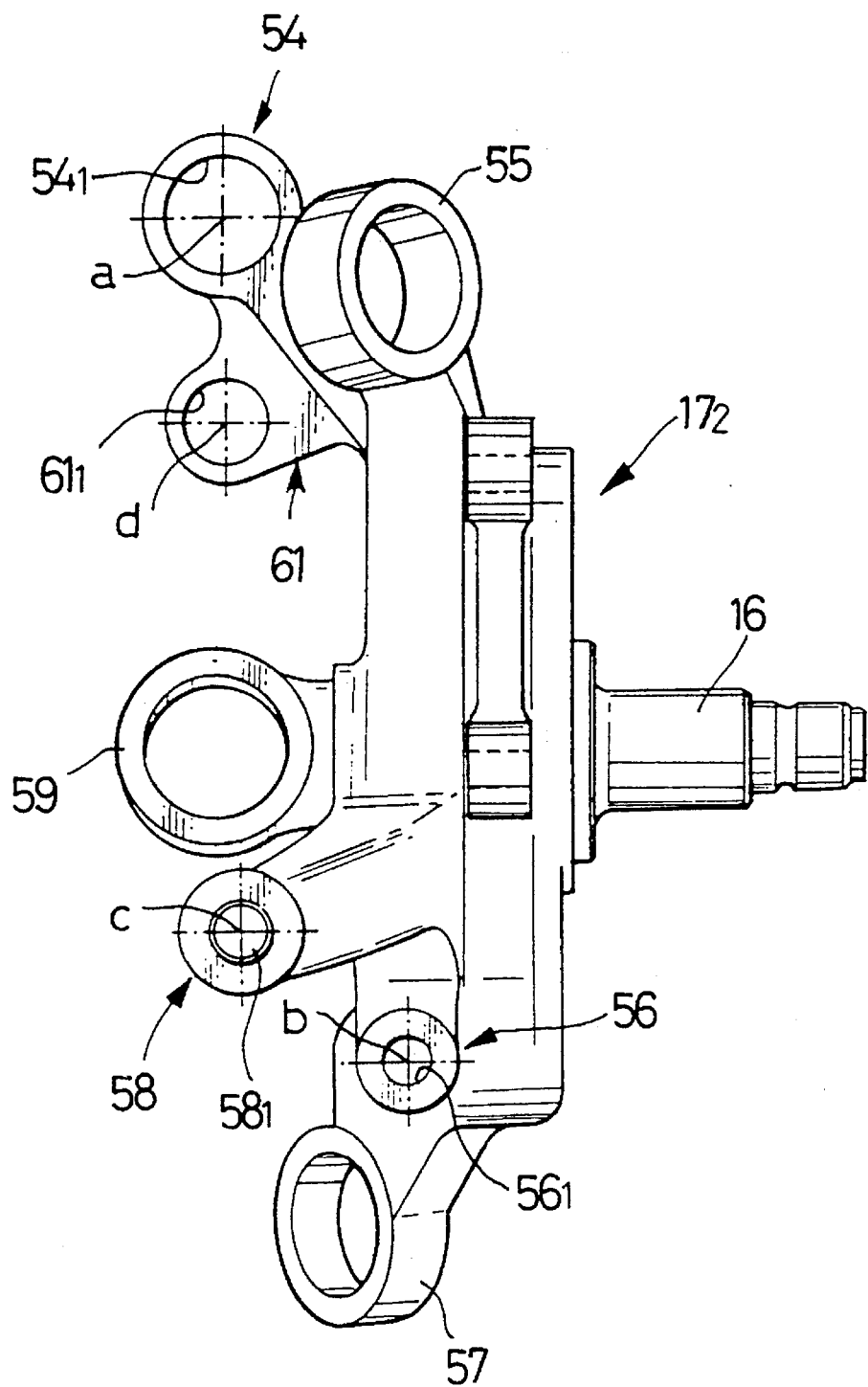

The structure of one of the knuckles $17_2$ will be described in connection with FIGS. 14 and 15.

As described above, the knuckle $17_2$, FIGS. 14 and 15, is integrally provided with the axle 16, the upper arm-mounting arm 54 the leading arm-mounting arm 55, the lower arm-mounting arm 56, the trailing arm-mounting arm 57, the control arm-mounting arm 58 and the stabilizer link-mounting arm 61. An axis a of a mounting bore $54_1$, for mounting the resilient joint to the upper arm-mounting arm 54, axes b of mounting bores $56_1$ and $57_1$, for mounting the resilient joints to the lower arm-mounting arm 56 and the trailing arm-mounting arm 57, an axis c of a mounting shaft $58_1$ for mounting the resilient joint to the control arm-mounting arm 58, and an axis d of a mounting bore $61_1$ for mounting the resilient joint to the stabilizer link-mounting arm 61, are all extended parallel in the longitudinal direction of the vehicle body. Thus, it is possible to simultaneously machine the four mounting bores $54_1$, $56_1$, $57_1$ and $61_1$ and the single mounting shaft $58_1$ by a multi-spindle machine tool, thereby reducing the number of steps to reduce the machining cost. It should be noted that the mounting bores $56_1$ and $57_1$ are coaxial and hence, can be machined by a single tool.

The operation of the second embodiment having the above-described construction will be described below mainly in connection with FIG. 16. FIG. 16 is a view of the right rear wheel taken from the inside of the vehicle body, similar to FIG. 13 illustrating the present embodiment.

When the rear wheel W runs onto a stepped portion, a small stone, or the like, on a road surface during traveling of the vehicle, the knuckle $17_2$ is bumped upwardly from the neutral position while contracting the damper $18_2$; then is exceeding the neutral position by a resilient force of a coil spring of the damper $18_2$ and rebounded downwardly; and restored to the neutral position under a vibration-damping effect of a shock absorber of the damper $18_2$, while alternately repeating the bumping and rebounding. During this time, the knuckle $17_2$ is vertically moved on a locus L connecting a front lower portion and a rear upper portion of the vehicle body, because the trailing arm $11_2$ extends rearwardly of the vehicle body from the trailing arm bracket $6_2$ of the subframe SF and is connected to the trailing arm-mounting arm 57 below the knuckles $17_2$, and because the leading arm $15_2$ extends forwardly of the vehicle body from the leading arm bracket $10_2$ of the subframe SF and is connected to the leading arm-mounting arm 55 above the knuckle $17_2$.

During this time, the knuckle $17_2$ is moved parallel along the locus L without a rotating movement and hence, the position of the stabilizer link-mounting arm 61 of the knuckle $17_2$, i.e., the position of the upper end of the stabilizer link $21_2$, is also moved on a locus L' parallel to the locus L. As can be seen from FIGS. 16 and 13, the locus L' for the position of the upper end of the stabilizer link $21_2$ is substantially matched with a circular arc R about the stabilizer supporting member $20_2$. For this reason, even if the upper end of the stabilizer link $21_2$ is vertically moved along the locus L' together with the knuckle $17_2$, a triangular shape formed by the stabilizer supporting member $20_2$, the upper end of the stabilizer link $21_2$ (the rubber bush joint 62) and the lower end of the stabilizer link $21_2$ (the rubber bush joint 63) is not deformed, and the angle $\alpha$ formed between the stabilizer link $21_2$ and the arm portion $19_{22}$ of the stabilizer $19_2$ is always constant and maintained at a substantially right angle. Therefore, as compared with a construction in which a torsion bar is disposed on a front portion of the subframe SF, the vertical movement of the knuckles $17_2$ for the left and right wheels causes the torsion portion $19_{21}$ to be more effectively torsionally deformed through the stabilizer links $21_2$, $21_2$ and the arm portions $19_{22}$, $19_{22}$, thereby enabling the function of the stabilizer $19_2$ to be exhibited sufficiently.

In FIG. 13, even if the knuckle $17_2$ is vertically moved along the locus L, the angle $\alpha$ formed between the stabilizer link $21_2$ and the arm portion $19_{22}$ is maintained at the substantially right angle, as described above, the stabilizer link $21_2$ can be hardly swung in the direction indicated by an arrow p. Therefore, in FIG. 14, it is possible to form the axis d of the mounting bore $61_1$ in the stabilizer link-mounting arm 61 in parallel to the axis a of the mounting bore $54_1$ in the upper arm-mounting arm 54, the axis b of the mounting bore $56_1$ in the lower arm-mounting arm 56, the axis c of the mounting shaft $58_1$ of the control arm-mounting arm 58, thereby reducing the machining cost of the knuckle $17_2$, as described above.

Although the embodiments of the present invention have been described in detail, it will be understood that the present invention is not limited to these embodiments, and various modifications in design can be made without departing from the spirit and scope of the invention defined in claims.

What is claimed is:

1. A subframe assembly for attachment as a unit to a vehicle body, comprising:

a fuel tank;

a preassembled subframe including a pair of oppositely spaced left and right side members interconnected with a pair of oppositely spaced cross members to define a substantially rectangular space receiving said fuel tank;

means for connecting said fuel tank to said subframe;

left and right suspensions;

means for attaching said left and right suspensions to said subframe including left and right suspension brackets for said left and right suspensions mounted at corners of said subframe at junctions between the left and right side members and one of said cross members with each of said suspension brackets being fixed between a side member and said one cross member;

a stabilizer resiliently supported on said one cross member adjacent said suspension brackets to be disposed at a lower portion of the vehicle body and extending between and interconnecting said left and right suspensions.

2. A subframe assembly according to claim 1, for attachment to a main frame on said vehicle body wherein said one cross member connects front ends of said left and right side members, and said subframe includes left and right mounts adjacent said junctions for fixing said subframe to said main frame, and wherein said stabilizer extends along a front surface of said one cross member and has opposite ends connected to the left and right suspensions in bypassing relation with respect to said left and right mounts.

3. A subframe assembly according to claim 1, wherein said stabilizer includes a torsion portion extending widthwise of the subframe and an arm portion integrally connected to each of opposite ends of said torsion portion and extending forwardly of said subframe, a stabilizer holder attached to said subframe for supporting said torsion portion, and each of said suspensions on said subframe comprising a knuckle for supporting a wheel having an axle, a trailing arm extending rearwardly of said subframe from a first support point on said subframe and connected to said knuckle at a location below said wheel axle, a leading arm extending forwardly of said subframe from a second support point on said subframe and connected to said knuckle at a location above said wheel axle, and at least one lateral arm extending widthwise of said subframe from a third support point on said subframe and connected to said knuckle, said stabilizer holder being disposed on said subframe at a location more rearwardly of said subframe than said knuckle, and a vertically extending stabilizer link connected at its upper end to an upper portion of said knuckle and at its lower end to a tip end of said arm portion of the stabilizer.

4. A subframe assembly according to claim 3, wherein a locus for movement of a connection between said knuckle and the upper end of said stabilizer link is substantially matched with a circular arc about said stabilizer holder.

5. A subframe assembly according to claim 3, wherein an axis of a mounting portion at an outer end of said lateral arm mounted on said knuckle and an axis of a mounting portion at said upper end of said stabilizer link are set substantially parallel to each other.

6. A subframe assembly according to claim 1, including an exhaust system comprising an exhaust pipe and an expansion chamber further supported by said subframe so as to be located at a lower portion of the vehicle body.

7. A subframe assembly according to claim 6, including support connections between said exhaust system and said subframe located both in front of and rearwardly of said suspensions, and said exhaust pipe is mounted on said subframe to extend along a laterally outer side of one of said side members.

8. A subframe assembly according to claim 7, wherein said exhaust pipe is supported laterally on one side of said subframe, and a filler pipe of said fuel tank is supported on the laterally other side of said subframe.

9. A subframe assembly according to claim 6 for attachment to a vehicle body having a seat disposed forwardly of said subframe, wherein said expansion chamber of said exhaust system is positionable in a lateral direction below a seat portion of said seat and is supported on said subframe.

10. A subframe assembly according to claim 1, wherein a filler pipe and a breather pipe are provided and connected at their lower ends to said fuel tank.

11. A subframe assembly for attachment to a vehicle body having a main frame provided on its lower surface with a recess, said subframe assembly comprising:

a fuel tank;

a preassembled subframe including interconnected left and right side members and cross members surrounding and supportedly attaching said fuel tank;

left and right suspensions attached to said subframe;

a filler pipe and a breather pipe connected to said fuel tank and being attached to one of said side members of said subframe;

an exhaust system including an exhaust pipe and an expansion chamber for disposition at a lower portion of said vehicle body and supported on said subframe by connections disposed in front of and rearwardly of said suspensions, said exhaust pipe extending along and being supported by the other of said side members, said expansion chamber being supported by one of the cross members on a front portion of said subframe;

wherein said subframe is mountable to a lower portion of said main frame such that said breather pipe can pass upwardly between said subframe and said main frame recess.

12. A subframe assembly according to claim 11, wherein said filler pipe and said breather pipe are supported on said subframe through resilient members, respectively.

13. A subframe assembly according to claim 12, wherein said filler pipe and said breather pipe include flexible portions between portions fixed to said vehicle body and said resilient members.

14. A subframe comprising left and right side members disposed on left and right sides, respectively, of a fuel tank to be mounted in a vehicle, left and right suspension brackets, each having a vertical portion and a horizontal portion, and vertically extending from said side members for supporting left and right suspension arms, respectively, and a cross member of L-shaped cross section extending between and interconnecting said side members, said cross member having vertical and horizontal portions joined to said vertical portions and horizontal portions of said suspension brackets, respectively.

15. A subframe assembly for attachment as a unit to a vehicle body, comprising:

a fuel tank;

a preassembled subframe including interconnected left and right side members and cross members surrounding and supportedly attaching said fuel tank;

left and right suspensions attached to said subframe, and each suspension including an upper suspension arm portion and a lower suspension arm portion; and an exhaust system including an exhaust pipe and an expansion chamber for disposition at a lower portion of said vehicle body and supported on said subframe by connections disposed in front of and rearwardly of said suspensions, said exhaust pipe extending along a laterally outer side of one of said side members and between said upper and lower suspension arm portions.

16. A subframe assembly for attachment as a unit to a vehicle body, comprising:

a fuel tank;

a preassembled subframe including interconnected left and right side members and cross members surrounding and supportedly attaching said fuel tank;

left and right suspensions attached to said subframe;

a filler pipe connected to said fuel tank and being attached to one of said side members of said subframe; and an exhaust system including an exhaust pipe and an expansion chamber for disposition at a lower portion of said vehicle body and supported on said subframe by connections disposed in front of and rearwardly of said suspensions, said exhaust pipe extending along and being supported by the other of said side members of said subframe, and said expansion chamber being supported by one of said cross members disposed in a front portion of said subframe.

* * * * *